US006896467B2

(12) United States Patent
Bouche et al.

(10) Patent No.: US 6,896,467 B2
(45) Date of Patent: May 24, 2005

(54) STORAGE SHELVING COMPRISING A LIFT

(75) Inventors: Norbert Bouche, Landau (DE); John McFarland, Rugby (GB)

(73) Assignee: Bellheimer Metallwerk GmbH, Bellheim/Pfalz (DE)

( * ) Notice: Subject to any disclaimer, the term of this patent is extended or adjusted under 35 U.S.C. 154(b) by 103 days.

(21) Appl. No.: 10/344,869
(22) PCT Filed: Mar. 20, 2002
(86) PCT No.: PCT/DE02/01073
§ 371 (c)(1),
(2), (4) Date: Feb. 14, 2003
(87) PCT Pub. No.: WO02/076857
PCT Pub. Date: Oct. 3, 2002

(65) Prior Publication Data
US 2004/0099188 A1 May 27, 2004

(30) Foreign Application Priority Data
Mar. 23, 2001 (DE) .......................................... 101 15 765

(51) Int. Cl.[7] .................................................. B65G 1/04
(52) U.S. Cl. ........................ 414/277; 108/107; 211/186
(58) Field of Search ................................ 414/267, 277; 312/265.1, 265.2, 265.3, 265.4; 248/239, 250; 211/133.1, 186, 187, 192; 108/107, 109, 110, 147.11, 147.16, 147.17, 180, 193

(56) References Cited

U.S. PATENT DOCUMENTS

| 1,059,464 | A | * | 4/1913 | Hine .......................... 108/107 |
| 1,164,439 | A | * | 12/1915 | Winquist ..................... 108/110 |
| 3,844,231 | A | * | 10/1974 | Peacock ...................... 108/107 |
| 5,599,154 | A | * | 2/1997 | Holscher et al. ............. 414/278 |
| 5,687,858 | A | * | 11/1997 | Bouche ....................... 211/121 |
| 5,735,221 | A | * | 4/1998 | Benayon ...................... 108/107 |
| 5,735,411 | A | * | 4/1998 | Flamme et al. ............... 211/26 |
| 5,806,820 | A | * | 9/1998 | Simon ......................... 248/243 |
| 5,833,427 | A | * | 11/1998 | Siegler et al. .............. 414/277 |
| 6,352,164 | B1 | * | 3/2002 | Hyatte et al. ................ 211/192 |

FOREIGN PATENT DOCUMENTS

| DE | 8235808 | 8/1988 |
| DE | 29506782 | 7/1995 |
| DE | 29807208 | 8/1999 |

* cited by examiner

Primary Examiner—James W. Keenan
(74) Attorney, Agent, or Firm—Mark P. Stone

(57) ABSTRACT

A storage lift has shelving columns having lateral panels provided with support sections (5) for storage goods carriers. Each column has four stays (4) configured as mountable and dismountable panel elements (7). The panel elements have a sandwich-type structure consisting of a contoured plate (12) and a support plate (13) connected to it to increase the rigidity of the support sections (5). The structure of the storage width facilitates and accelerates construction of storage lifts on site.

20 Claims, 4 Drawing Sheets

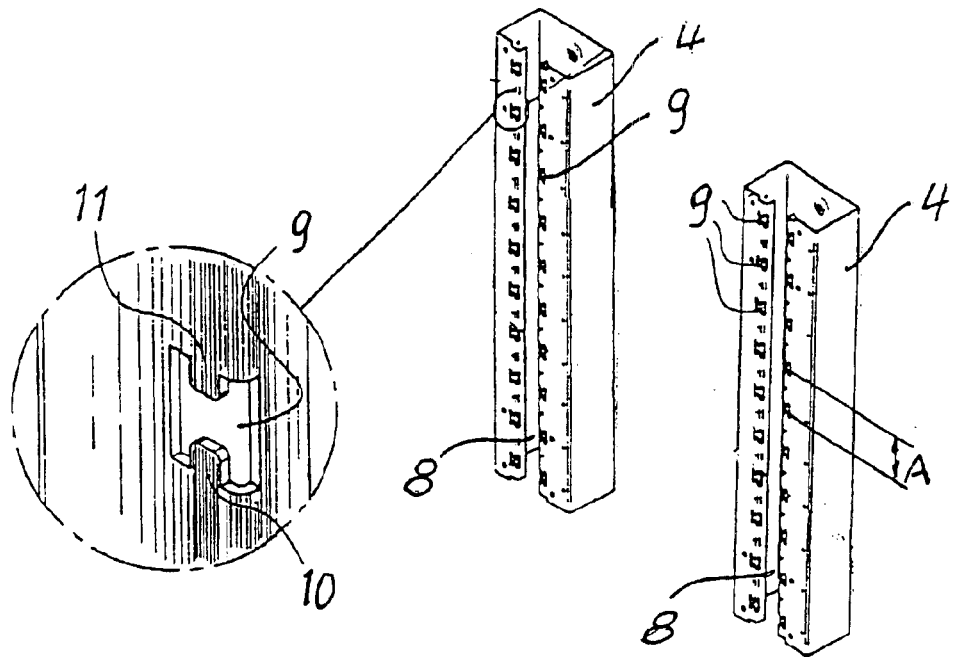
Fig. 2
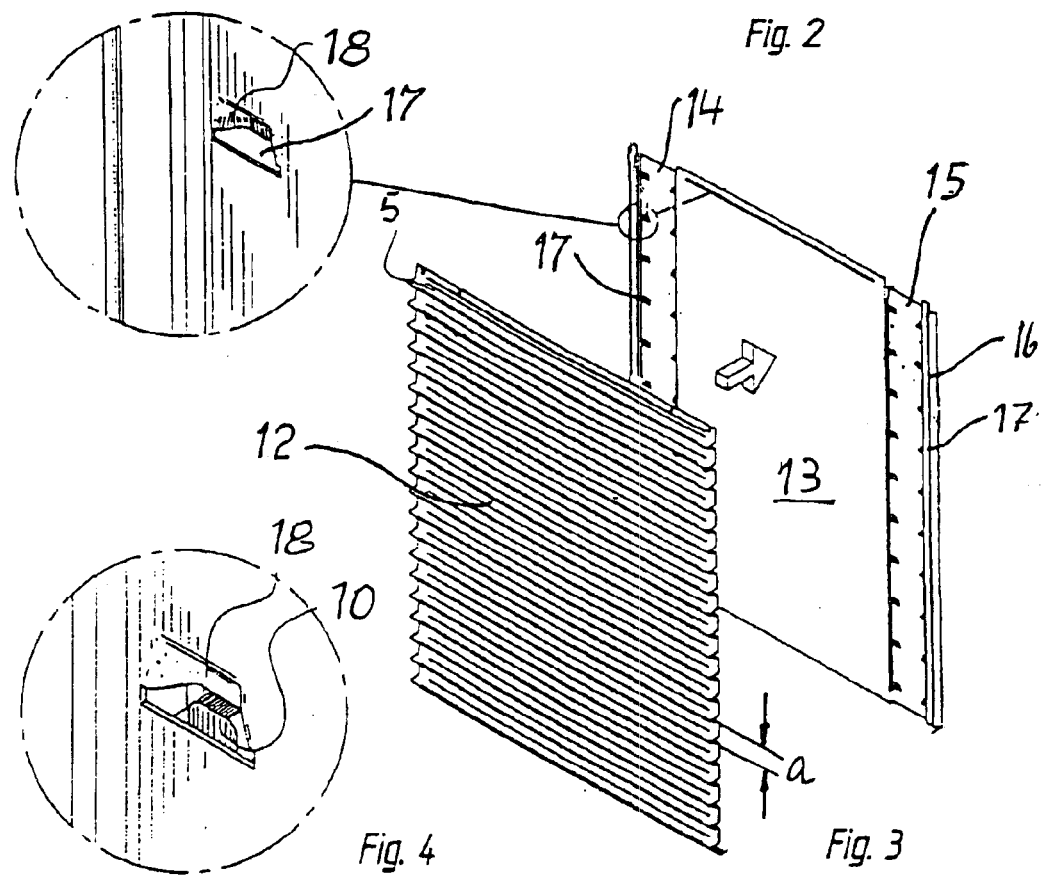
Fig. 3
Fig. 4

STORAGE SHELVING COMPRISING A LIFT

The invention relates to a store lift with a multiplicity of pairs of supporting profiles which are spaced apart one above the other on mutually opposite walls of a housing and are intended for storage-article carriers which can be stored and retrieved, and with a vertical conveyer which can be moved up and down in relation to the pairs of supporting profiles and is provided with a horizontal conveying arrangement by means of which a horizontal movement can be introduced into the storage-article carriers in order to transfer them from the vertical conveyer to a pair of supporting profiles in each case or from a pair of supporting profiles to the vertical conveyer, the supporting profiles being designed as convexities which project into the interior of the housing and are integral to profile panels which have an essentially meandering cross section and are fastened on vertical supporting posts.

Store lifts of the abovementioned type stand on a comparatively small surface area and, not least for this reason, can be integrated particularly well in industrial construction processes, be it for the storage of tools or for the intermediate storage of workpieces. On account of their size, assembly at the site of installation is imperative, the use of pre-assembled subassemblies contributing to rapid construction, which is required by the customer, and consequently being very much the norm. The selection and configuration of different subassemblies, each forming final assembly units, are of critical importance here.

Increasing transportation and final assembly problems occur, however, as the size of the individual subassemblies which are to be connected to one another on site increases.

In the case of a store lift known from DE 195 01 718 A1, the profile panels, which consist of sheet steel, are welded, in the region of their vertical borders, to the supporting posts of the lift to form comparatively heavy and bulky assembly units which form side-wall parts of the housing of the store lift.

The dimensions of the abovementioned assembly units make the latter more difficult both to transport and to assemble on site. Apart from this, it is also the case that the known design cannot be fully satisfactory insofar as, in order to achieve sufficient rigidity of the supporting profiles, the thickness of the steel sheets used to produce the same has to be comparatively large. The fact that the wall parts formed by the profile panels form not just profiled inner-wall sections but also profiled outer-wall sections, which give rise to undesired dust deposits, additionally proves to be inexpedient in cases of the known store lift.

Side-wall sections which are produced from sheet steel by virtue of hollow webs which form supporting profiles being pressed in are also known from DE 298 07 208 U1. In this case, during assembly of the store lift, comparatively small profile panels are connected to the supporting posts by a multiplicity of screws. The amount of time required for the screw-connection operation and the costs for producing the threaded bores in the supporting posts are considerable. As with the known store lift described previously, the rigidity of the profile webs is associated with the problem of the cost-effective production of the profiling requiring small sheet-metal thicknesses, while the satisfactory support of the load-carriers, in contrast, requires large sheet-metal thicknesses.

The object of the invention is to provide a store lift of the type in question, which is equipped with highly rigid profile panels which are cost-effective to produce and quick to install. The object is achieved according to the invention in that the profile panels are stiffened on their outsides by supporting panels which are firmly connected to them to form a sandwich-like wall element, and in that each of the walls provided with supporting profiles comprises a plurality of wall elements which are arranged one above the other and of which the supporting panels can be fitted individually into the supporting posts.

The sandwich construction of the profile panels of the store lift according to the invention benefits not just the bending strength of the individual profiles but also the panel as a whole, and thus allows the use of the proposed "fit-in-type assembly". It goes without saying that an additional advantage is provided by the fact that the outer side-wall sections of the lift housing which are equipped with profile panels have a smooth surface achieved by the supporting panels.

Further features and details of the invention can be gathered from the subclaims and from the following description of an exemplary embodiment illustrated in the attached drawings, in which:

FIG. 2 shows, on an enlarged scale, details of the supporting posts of the store lift according to FIG. 1;

FIG. 3 shows, on an enlarged scale, details of the panels which are to be connected to one another to form wall elements for the store lift according to FIG. 1;

FIG. 4 shows the parts which engage with one another when wall elements are fitted into the supporting posts;

Figure 1:
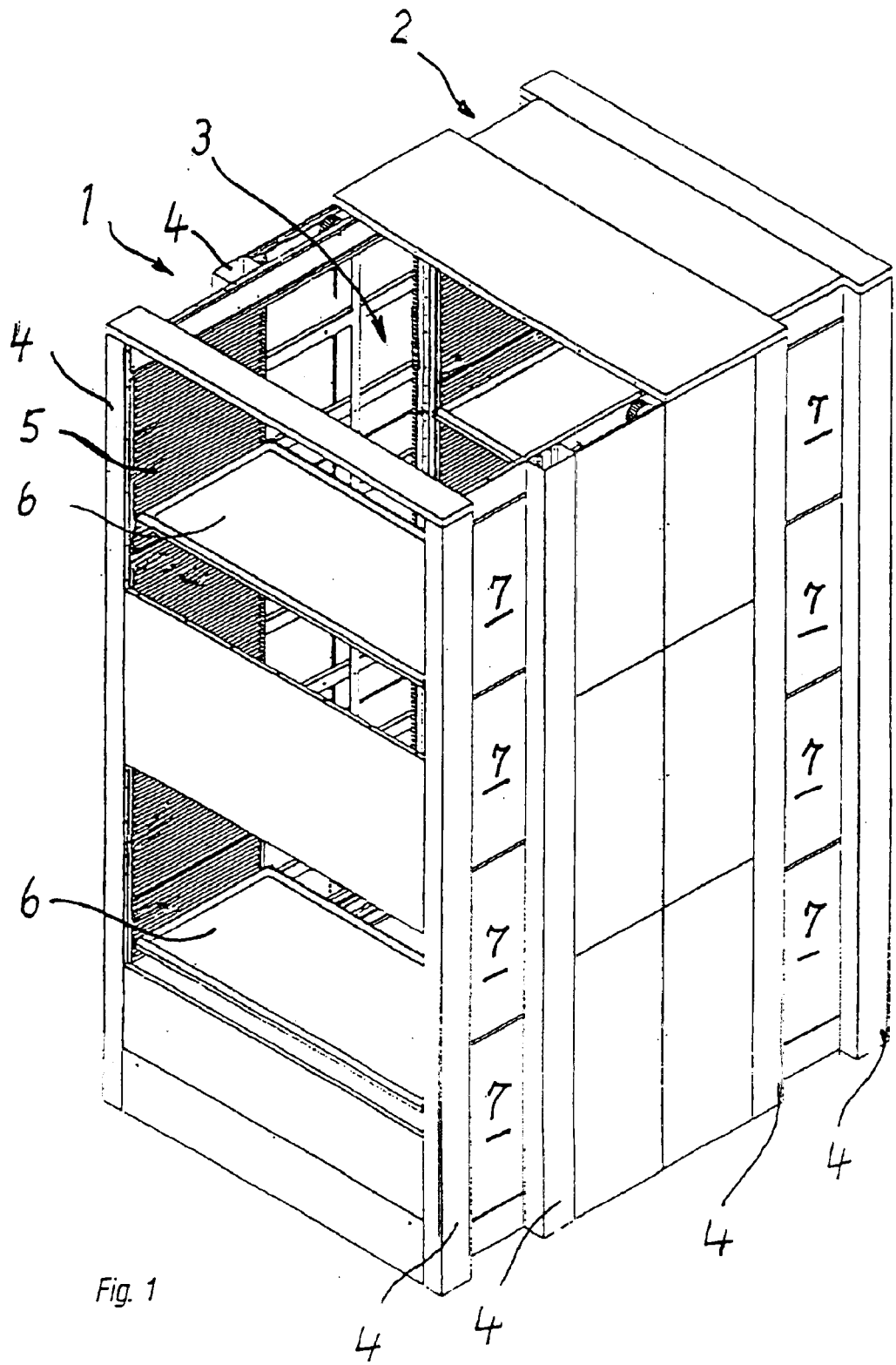
FIG. 1 shows the perspective view of a store lift, assembly of which is largely complete.

The store lift illustrated in FIG. 1 comprises two rack columns 1 and 2 which enclose between them a shaft 3 for a vertical conveyer (not illustrated) and of which each has four supporting posts 4, to which in each case a plurality of lateral wall elements 7, which form supporting profiles 5 for storage-article carriers 6, are connected in a releasable manner. As generally illustrated by FIG. 1, the supporting profiles 5 form bulges which project into a housing for the storage-article carriers 6. The basic construction described above corresponds to the prior art and thus need not be explained in any more detail.

In contrast to what has been known up until now, the supporting posts 4, which have a C-profile cross section, are each provided, on both sides of their vertically running longitudinal slots 8, with a row of H-shaped punched-out portions 9, which follow one after the other at the spacing A and of which each forms two mutually opposite retaining protrusions 10, 11. The H-shape of the punched-out portions 9 means that the fitter of the store lift need not maintain a certain pivoting direction when the supporting posts 4 are being rendered upright. If one is prepared to do without this opportunity to disregard the pivoting direction, then the H-shaped punched-out portions may be replaced by T-shaped punched-out portions with just one retaining protrusion in each case.

The punched-out portions 9 allow the convenient and quick fitting, and in cases of damage the just as straightforward removal, of wall elements 7 which, in the present case, each comprise a profile panel 12 and a supporting panel 13 connected in a sandwich-like manner thereto. In FIG. 3, to aid understanding, the two panels 12, 13 are illustrated separately from one another. As can be seen, in the region of its side borders which are to be connected to the supporting posts 4, the supporting panel 13 has vertically running U-shaped profile sections 14, 15 which, on the one hand, increase the stability of the supporting panel 13, and, on the other hand, allow one of the side borders of the supporting panel 13 to be used as a directing flank 16 for storage-article carriers 6 which are to be transferred to the supporting profiles 5 of the profile panels 12 in the region of a charging opening.

The supporting panels 13 are provided with punch-out portions 17 which are assigned to the punched out portions 9 and form dormer-window-like protrusions 18, which provide pockets for accommodating the retaining protrusions 10 which can be seen from FIG. 4.

Figure 5:
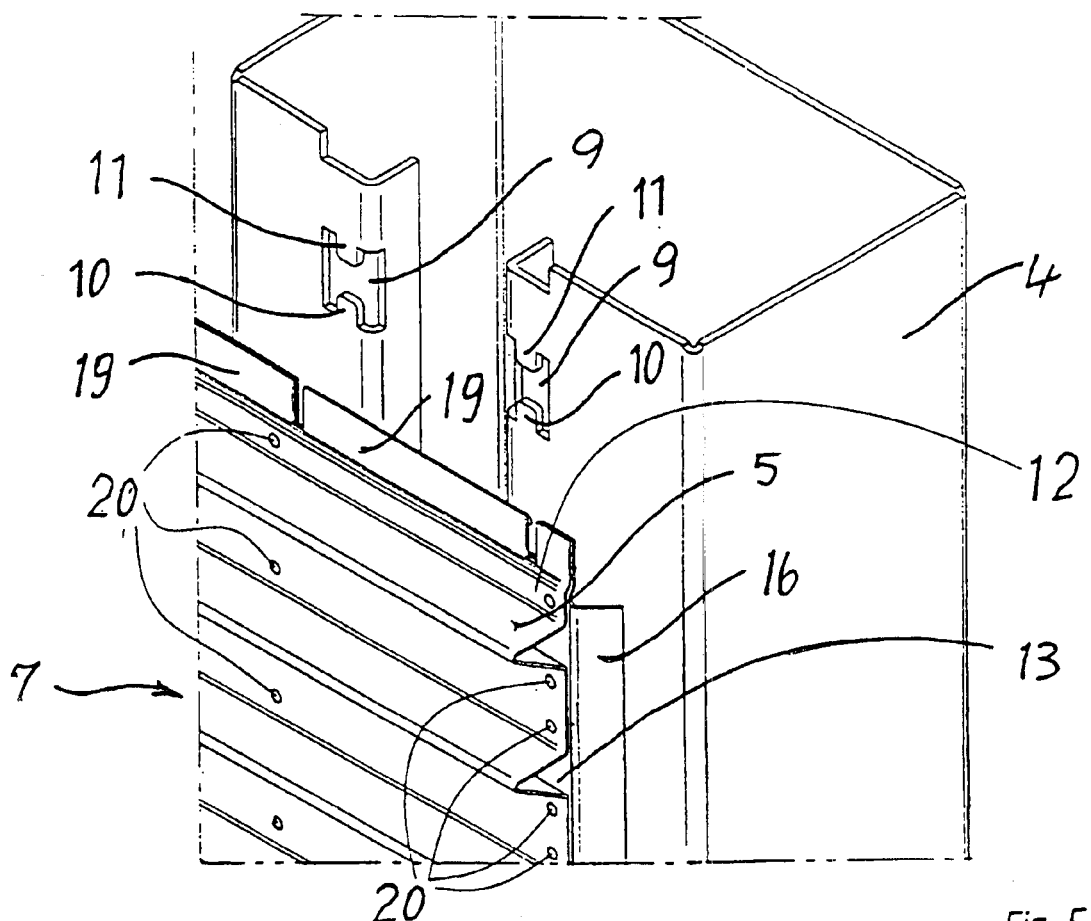
FIG. 5 shows the partial view of a wall element fitted into a supporting post.
Figure 6:
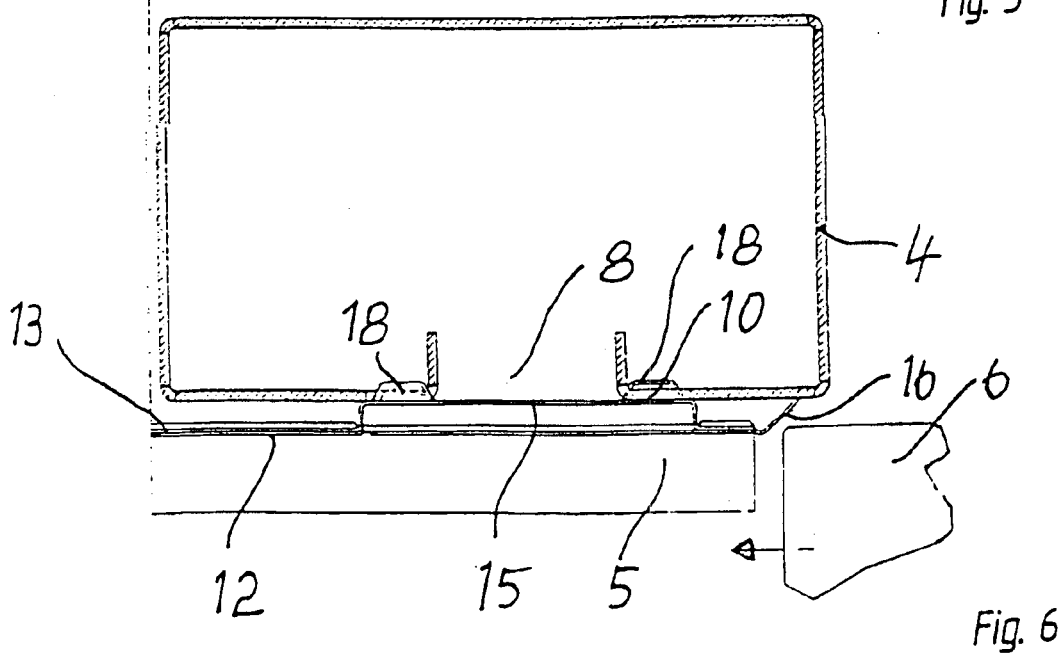
FIG. 6 shows a section through the parts illustrated in FIG. 5.
Figure 7:
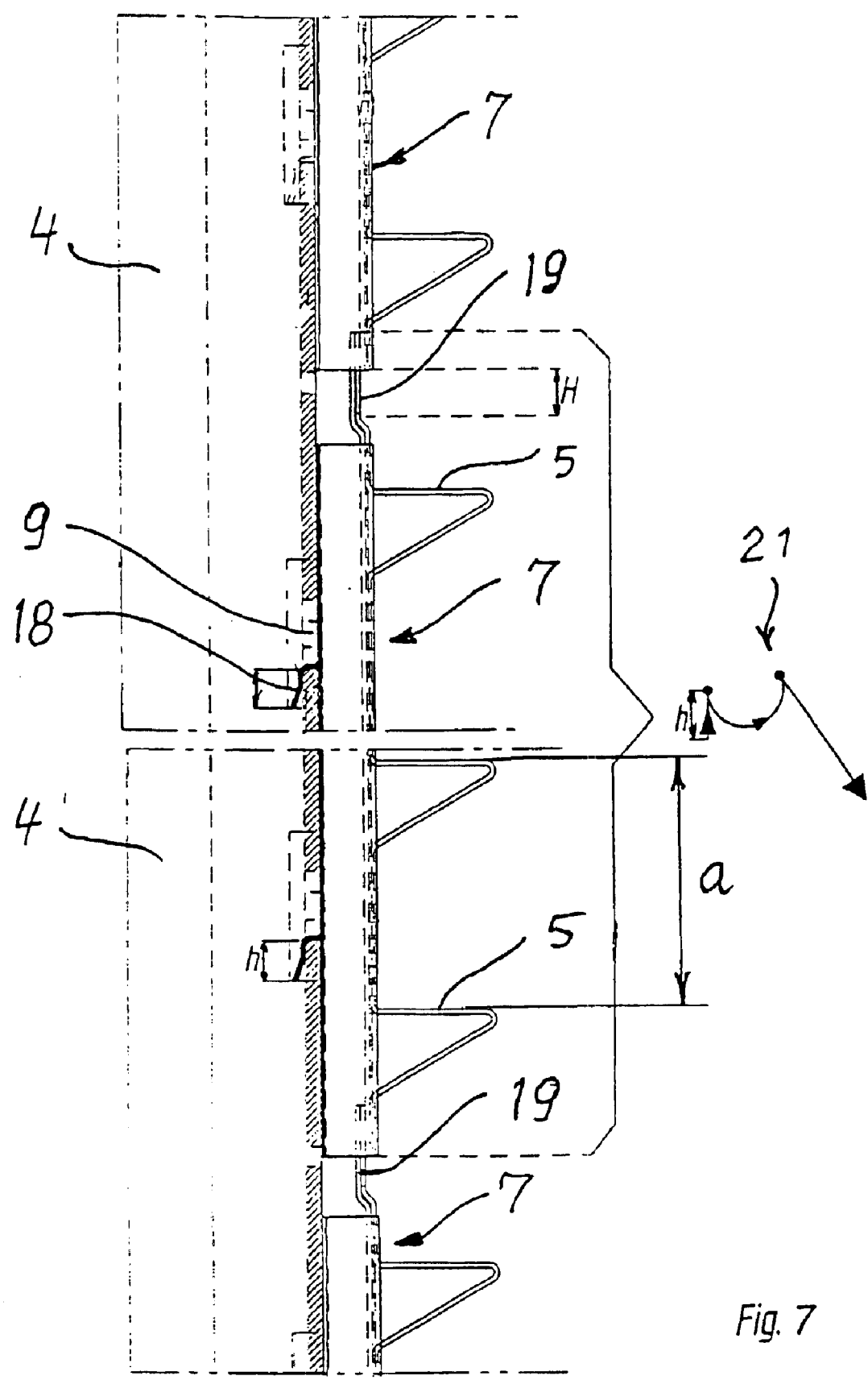
FIG. 7 shows a schematic illustration of the overlapping parts of three wall elements arranged one above the other.

FIG. 5 shows, on an enlarged scale, part of a wall element 7 which is fitted into a supporting post 4 and, at its top horizontal border, is provided with lug-like protrusions 19 which—as can be gathered from FIG. 7 —allow successive wall elements 7 to be arranged in an overlapping manner. A multiplicity of weld spots 20 serve for connecting the respective profile panel 12 to a supporting panel 13. In order to ensure a stable connection between the wall elements 7 and the supporting posts 4, the spacing A between in each case two adjacent punched-out portions 9 or 17 should be no greater than three times the spacing a between successive supporting profiles 5 in each case. As illustrated by FIG. 7, the supporting profiles (5) have a cross section which is formed by the legs of a right-angled triangle. Moreover, it should be ensured that the protrusions 19 are long enough to satisfy the condition H>h, i.e. in order for it to be possible for each wall element to be removed in the manner indicated at 21 in FIG. 7 and to be refitted in the opposite direction.

What is claimed is:

1. A store lift with a multiplicity of pairs of supporting profiles which are spaced apart one above the other on mutually opposite walls of a housing for storage-article carriers which can be stored and retrieved, and with a vertical conveyor which can be moved up and down in relation to the pairs of supporting profiles and is provided with a horizontal conveying arrangement by means of which a horizontal movement can be introduced into the storage-article carriers for transferring said storage-article carriers from the vertical conveyor to a pair of said supporting profiles or from a pair of said supporting profiles to the vertical conveyor, the supporting profiles forming bulges which project into the interior of the housing and are integral to profile panels which are fastened on vertical supporting posts, characterized in that the profile panels (12) are stiffened on their outsides by supporting panels (13) which are firmly connected to them to form a wall element (7), and in that each of the walls provided with supporting profiles (5) comprises a plurality of wall elements (7) which are arranged one above the other and of which the supporting panels (13) can be fitted individually into the supporting posts (4).

2. The store lift as claimed in claim 1, characterized in that the profile panels (12) are connected to the supporting panels (13) by a multiplicity of weld spots (20) at least at their borders and in their center.

3. The store lift as claimed in claim 2, characterized in that the supporting panels (13), in a region of their side borders which are to be connected to the supporting posts (4), have U-shaped profile sections (14, 15) which face towards the supporting posts (4) and extend in a vertical direction.

4. The store lift as claimed in claim 2, characterized in that the supporting posts (4) are provided with punched-out portions (9) which form retaining protrusions (10, 11).

5. The store lift as claimed in claim 1, characterized in that the supporting panels (13), in a region of their side borders which are to be connected to the supporting posts (4), have U-shaped profile sections (14, 15) which face towards the supporting posts (4) and extend in a vertical direction.

6. The store lift as claimed in claim 5, characterized in that the supporting posts (4) are provided with punched-out portions (9) which form retaining protrusions (10, 11).

7. The store lift as claimed in claim 1, characterized in that the supporting posts (4) are provided with punched-out, portions (9) which form retaining protrusions (10, 11).

8. The store lift as claimed in claim 7, characterized in that the punched-out portions (9) are of H-shaped design.

9. The store lift as claimed in claim 8, characterized in that the supporting posts (4), proximate to at least one of their outer borders, are provided with a vertically running row of said punched-out portions (9) spaced apart from each other.

10. The store lift as claimed in claim 7, characterized in that the supporting posts (4), proximate to at least one of their outer borders, are provided with a vertically running row of said punched-out portions (9) spaced apart from each other.

11. The store lift as claimed in claim 10, characterized in that the supporting posts (4) have a C-profile cross section and are provided with a vertical row of said punched-out portions (9) on both sides of a longitudinal slot (8) defined in each said supporting post (4).

12. The store lift as claimed in claim 7, characterized in that each of the supporting panels (13), proximate to its side borders, are provided with at least one row of punched-out portions (17) which form protrusions (18).

13. The store lift as claimed in claim 12, characterized in that two rows of said punched-out portions (17) which run vertically parallel to one another are arranged on each side border of each supporting panel (13).

14. The store lift as claimed in claim 13, characterized in that the vertical spacing between the respectively successive punched-out portions (17) of the supporting panels (13) and the vertical spacing between the respectively successive punched-out portions (9) of the supporting posts (4) is, at most, equal to the spacing between three of said supporting profiles (5) successively arranged relative to each other.

15. The store lift as claimed in claim 12, characterized in that the vertical spacing between the respectively successive punched-out portions (17) of the supporting panels (13) and the vertical spacing between the respectively successive punched-out portions (9) of the supporting posts (4) is, at most, equal to the spacing between three of said supporting profiles (5) successively arranged relative to each other.

16. The store lift as claimed in claim 1, characterized in that the side borders of the supporting panels (13) project beyond the end surfaces of the profile panels (12).

17. The store lift as claimed in claim 16, characterized in that at least one side border of the supporting panels (13) is designed as a directing flank (16) which centers the storage-article carriers (6).

18. The store lift as claimed in claim 1, characterized in that the wall elements (7) overlap in the region of their horizontal borders.

19. The store lift as claimed in claim 18, characterized in that the wall elements (7) are provided with protrusions (19) on one of their horizontal borders.

20. The store lift as claimed in claim 1, characterized in that the supporting profiles (5) have a cross section which is formed by the legs of a right-angled triangle.

* * * * *